United States Patent

[11] 3,589,744

[72] Inventor Carl J. Hansen
   West Shelby Road, Middleport, N.Y. 14105
[21] Appl. No. 840,200
[22] Filed July 9, 1969
[45] Patented June 29, 1971

[54] FARM VEHICLE
   16 Claims, 16 Drawing Figs.
[52] U.S. Cl. ..................................................... 280/32.5, 180/25
[51] Int. Cl. ..................................................... A01d 90/00
[50] Field of Search ........................................... 280/32.5, 34; 180/24, 26, 27

[56] References Cited
   UNITED STATES PATENTS
   1,210,056  7/1914  Fairman .................... 280/34
   2,583,358  1/1952  Cesan ...................... 280/32.5
   2,701,022  2/1955  Chestnutt .................. 180/26

Primary Examiner—Kenneth H. Betts
Assistant Examiner—John P. Silverstrim
Attorney—Sommer, Weber & Gastel ABSTRACT: A farm vehicle for working on low-growing crops including a central frame section mounting an engine and a seat for an operator, a front-end steering section connected to the main frame assembly and a superstructure assembly connecting both to rigidize the vehicle, a telescoping linkage on the front-end section for mounting spaced wheels between which the distance can be varied to fit between differently spaced rows of crops, carriers mounted on the vehicle abreast of the vehicle operator, and a steering linkage for turning the front wheels. A modified embodiment includes a plurality of quick-disconnect fittings on the front-end section to permit the central frame section to be mounted either centrally of the front end, or at either side thereof in line with the spaced wheels, the quick-disconnect connections also functioning to selectively receive supplemental rigs for carrying additional riders.

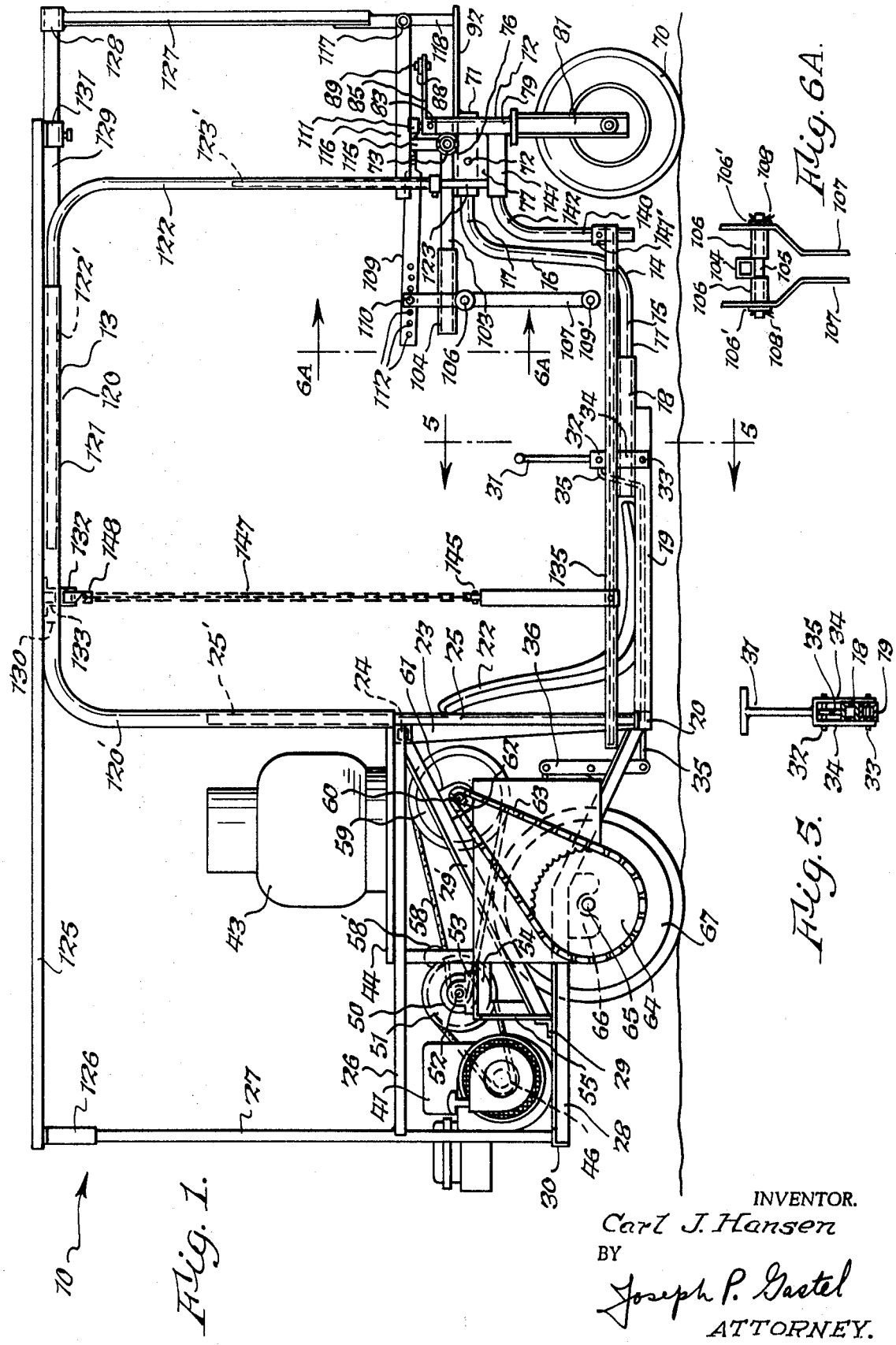

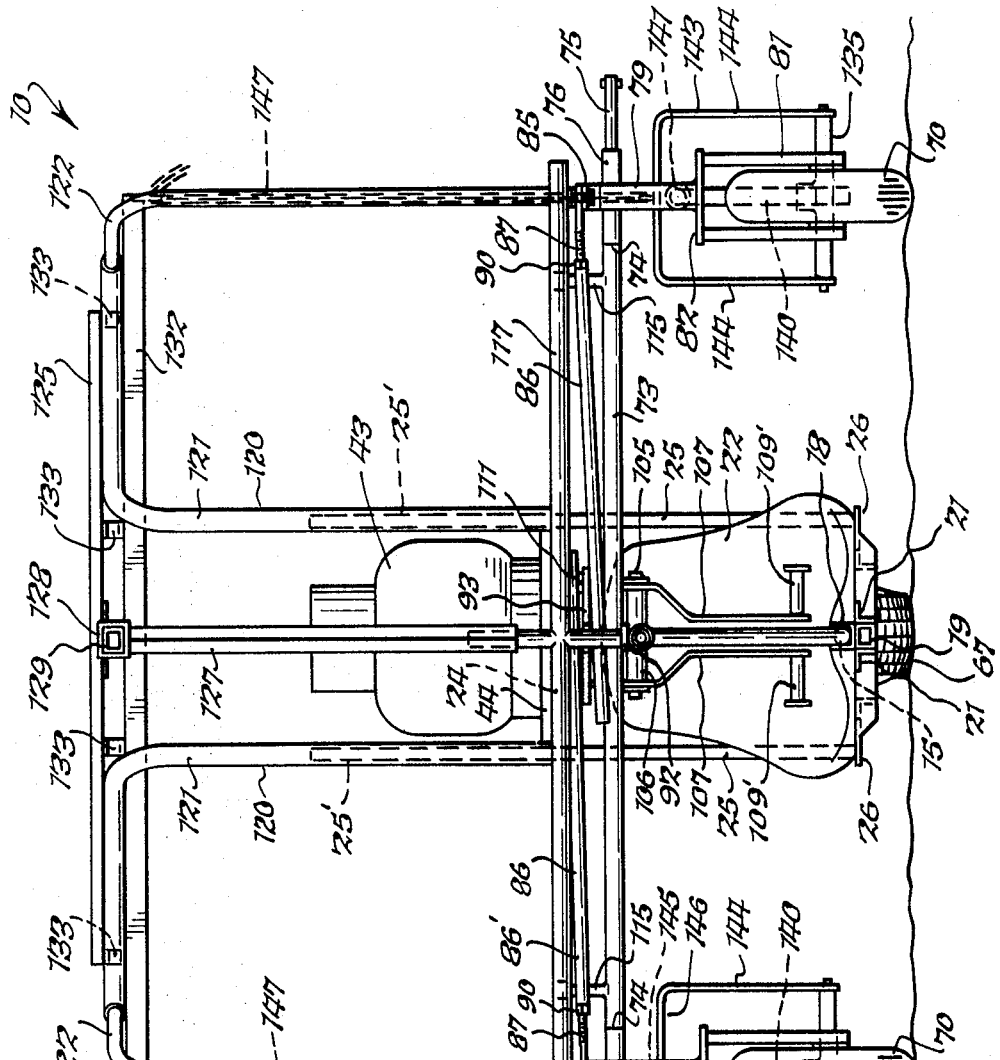

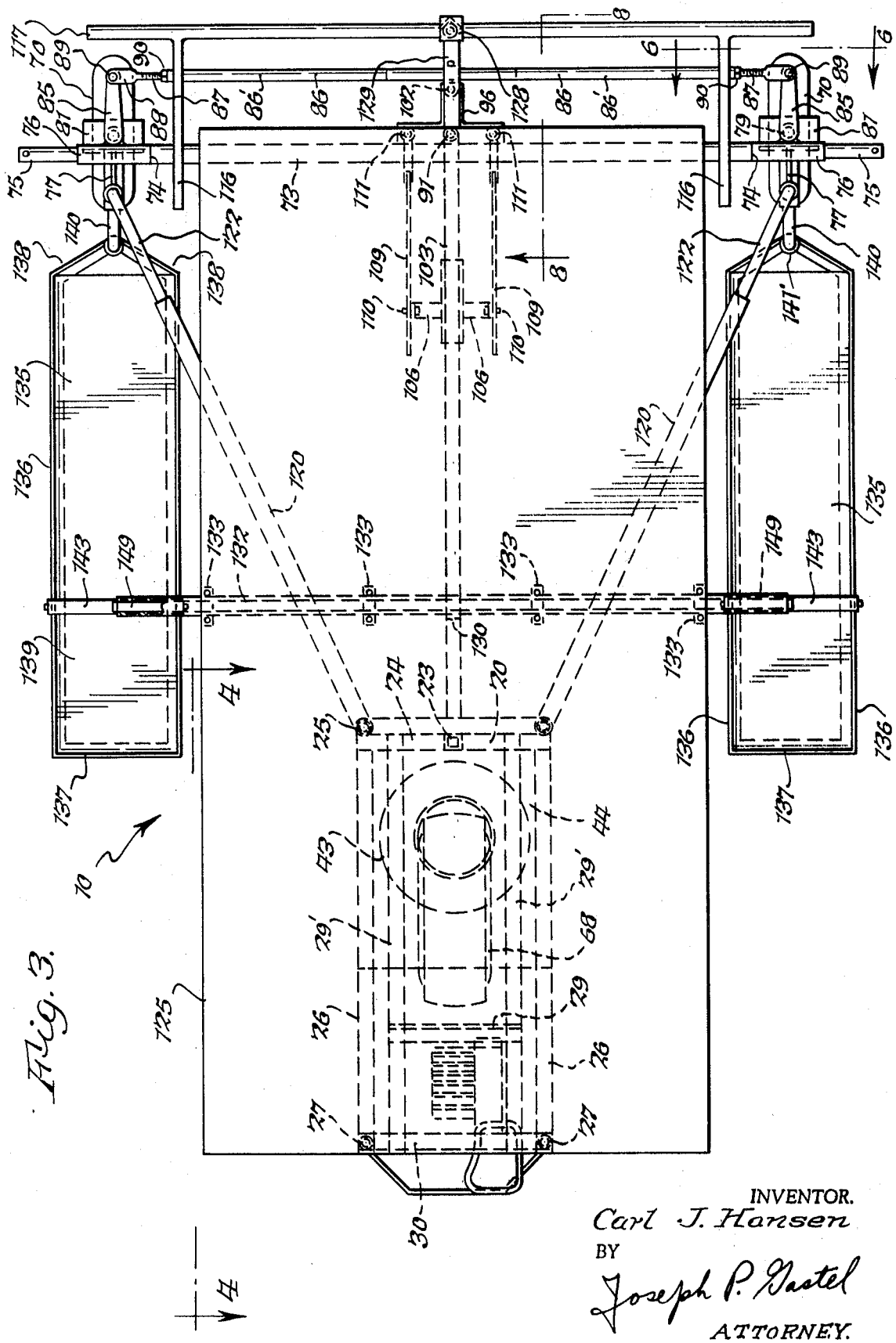

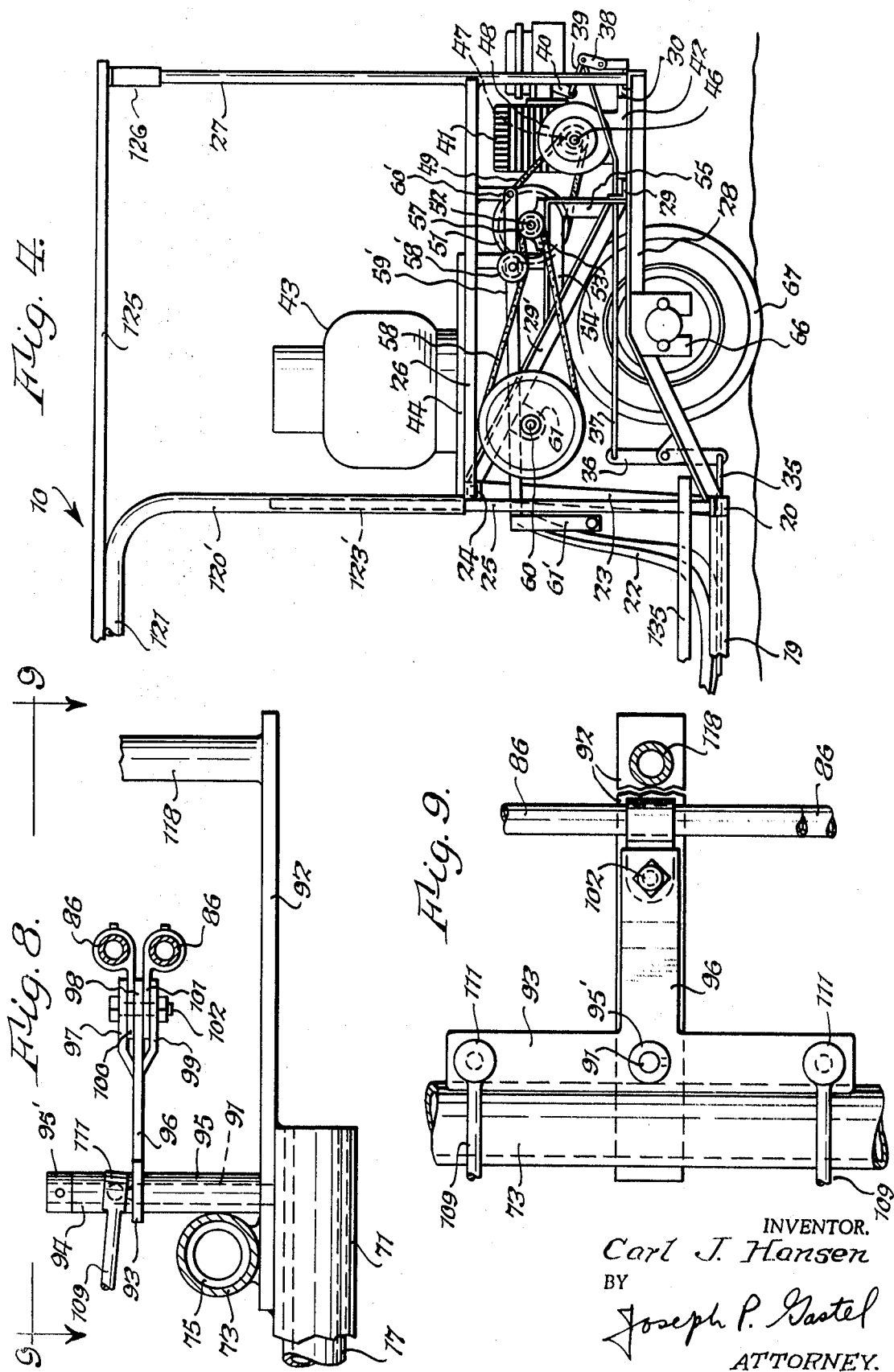

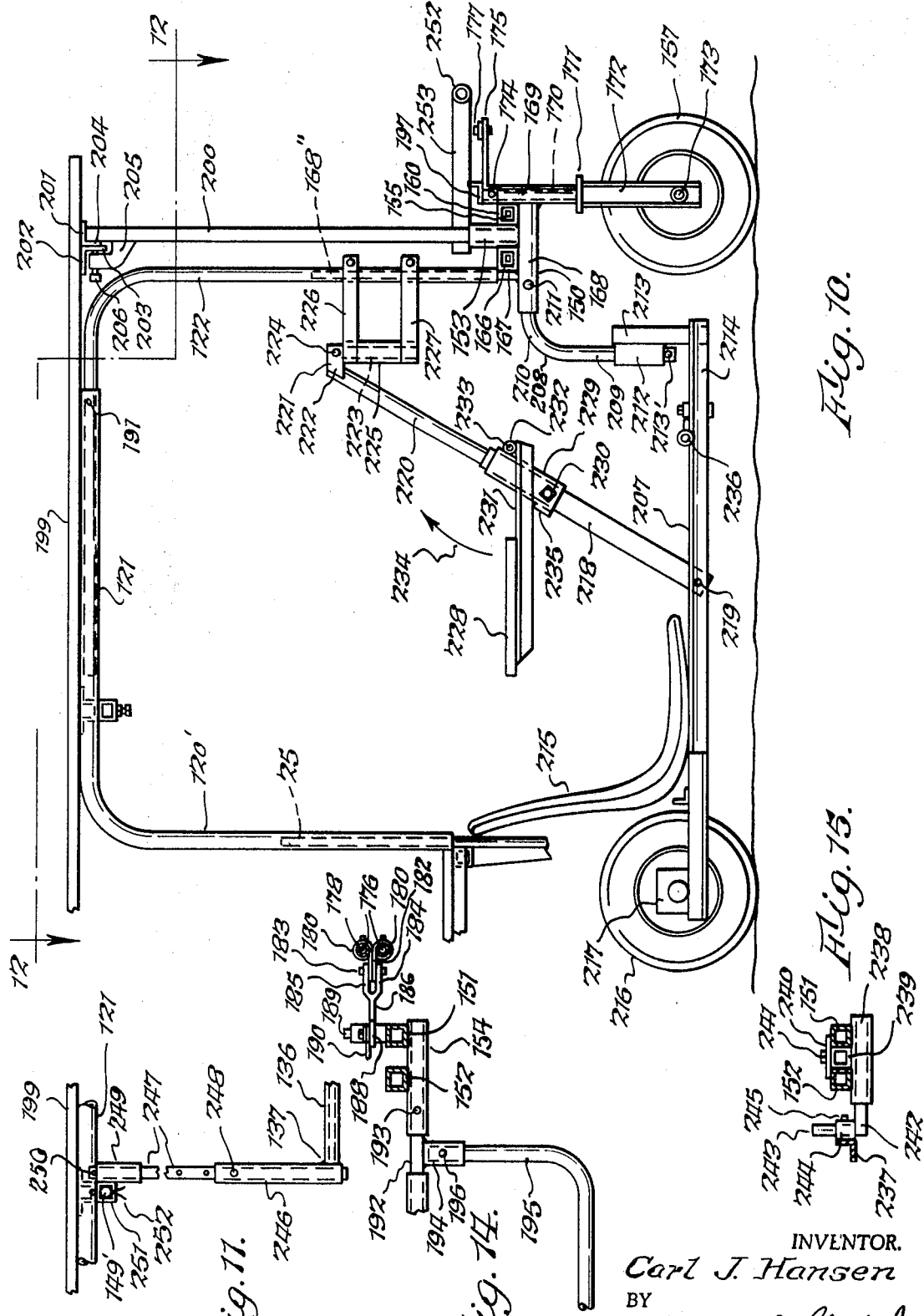

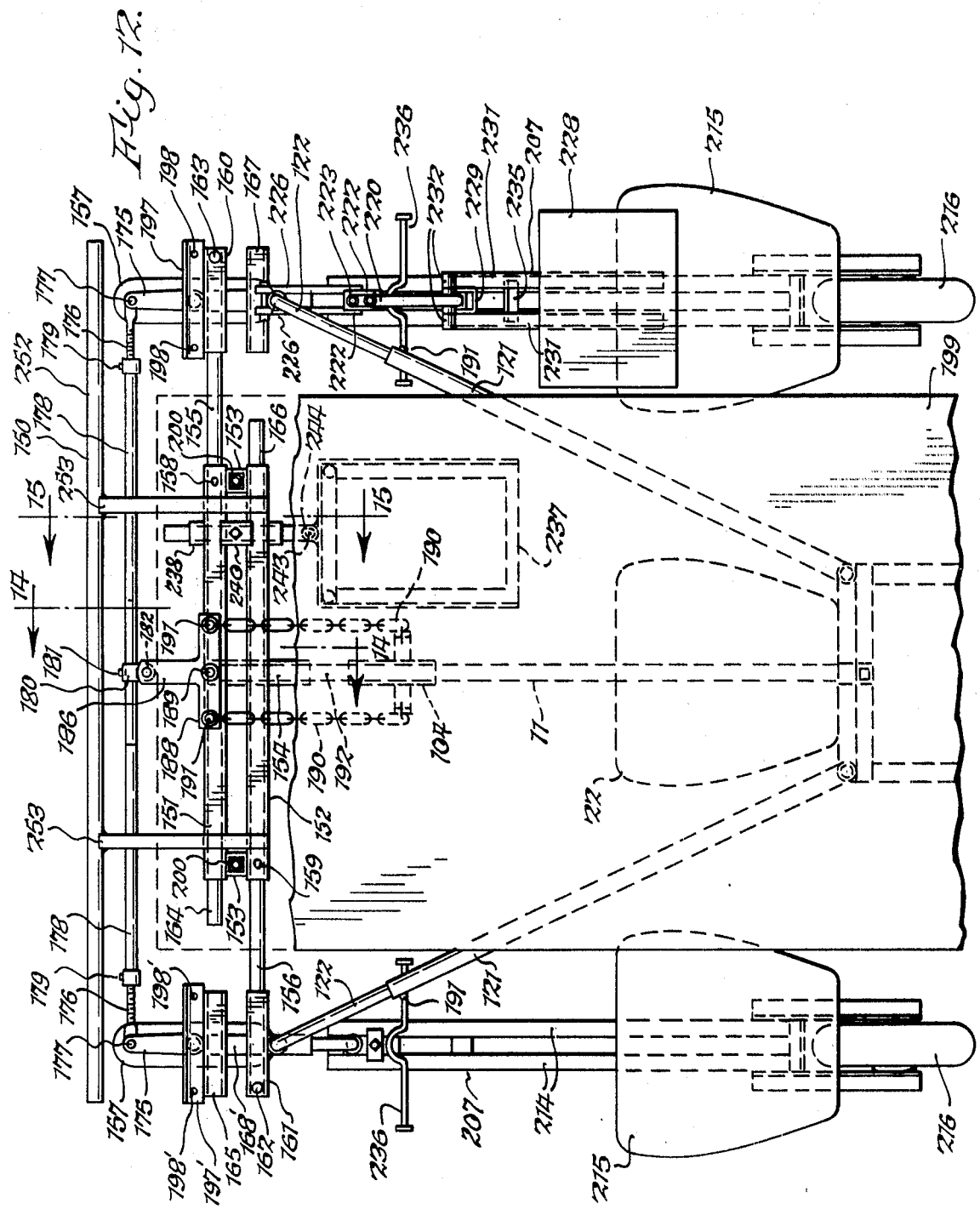

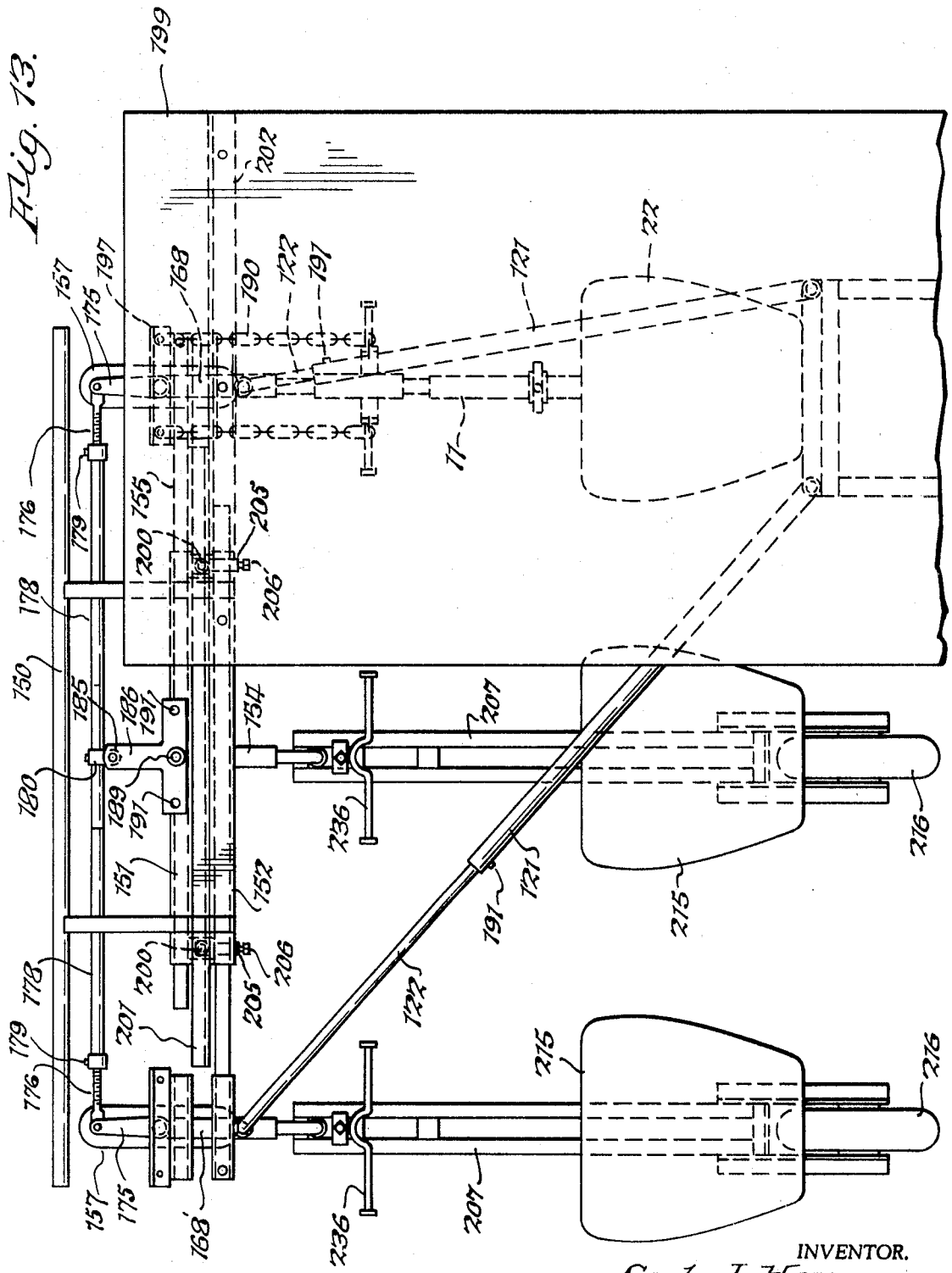

FARM VEHICLE

The present invention relates to an improved farm vehicle for permitting a worker to remain in sitting position close to the ground while driving the vehicle and simultaneously performing such tasks as setting, thinning, transplanting, weeding and harvesting low-growing crops.

Vehicles used in the farming of low-growing crops which were known in the past were subject to certain shortcomings. Generally these vehicles were relatively complicated and it was therefore difficult to adjust them for traveling through different crops in which the rows were spaced different amounts apart. Furthermore, the load-carrying capacity of previous vehicles was severely limited and therefore the operator had to make frequent trips back to a central area to deposit the harvested crops. Furthermore, previous vehicles were not at all versatile in that they were made in a specific design to carry either one or a plurality of workers but the vehicles could not be modified for one or the other. In addition, the previous vehicles were made so that the vehicle operator always occupied a predetermined position on the vehicle and his position could not be changed for the convenience of harvesting different types of crops or for suiting his own personal preferences. It is with an improved farm vehicle which overcomes all of the foregoing shortcomings that the present invention is concerned.

One object of the present invention is to provide an improved crop-harvesting vehicle which can be adjusted in an extremely simple manner to travel between rows of crops which are spaced different distances apart.

Another object of the present invention is to provide an improved highly versatile farm vehicle which can be transformed extremely easily from one which carries only the operator to one which also carries additional riders. A related object is to provide an improved farm vehicle which can be transformed extremely easily from one in which the driver is located centrally on the vehicle to one in which the operator is located at either side of the vehicle. A further related object of the present invention is to provide an improved harvesting vehicle in which the foregoing transformations can be effected quickly, easily and with a minimum of tools. Still another related object of the present invention is to provide an improved farm vehicle of the foregoing type which is extremely sturdy notwithstanding its high versatility.

A further object of the present invention is to provide an improved harvesting vehicle which has an extremely high load-carrying capacity so that a worker need not make frequent trips back to a central area for depositing the harvested crops.

Yet another object of the present invention is to provide an improved highly versatile farm vehicle which can be adjusted in an extremely simple manner to accommodate workers of different sizes to provide them with maximum comfort.

Still another object of the present invention is to provide an highly improved versatile farm vehicle having an extremely simplified construction which leads to economy of manufacture and dependability in operation. Other and attendant advantages of the present invention will readily be perceived hereafter.

The improved farm vehicle of the present invention consists essentially of three basic sections, namely, a main central frame assembly which carries the engine and on which the vehicle operator sits, a front-end steering assembly connected to the main frame assembly and a superstructure assembly connecting both to rigidize the vehicle. The wheels on the front-end assembly may be moved toward and away from each other to thereby vary their spacing to permit them to roll between the rows of crops which are spaced different amounts apart. This adjustment can be made simply and easily because of the use of a telescoping construction at the front end of the vehicle on which the wheels are mounted. Pivotal connections are provided between the superstructure and the other two sections so as to cause the superstructure to be self-adjusting to any wheel position. In the foregoing embodiment the main frame is located generally centrally of the vehicle, which in this instance is a three-wheeler. However, in a modified form of the present invention the front end has three laterally spaced connections so that the main frame can be mounted either centrally of the front end or at the right-hand or left-hand side thereof so that it may be in line with either of the wheels at the front end. This transformation can be made easily and quickly because of a simple connection between the front end and the main frame which can be assembled or disassembled easily. The above-described superstructure with its pivotal connections need not be disassembled during the process of transforming the vehicle because the pivotal connections are self-adjusting. Furthermore, a highly simplified steering linkage is provided on the central portion to permit the simple assembly and disassembly with the front end incidental to the foregoing transformations. In the modified form of the invention supplemental frames or rigs are provided which can be quickly and easily attached to the front end to carry additional riders in side-by-side relationship with the vehicle operator. The foregoing supplemental frame portions can be installed practically in a matter of seconds and they are mounted in an extremely sturdy manner so as to withstand the rigors of farm operation. The improved farm vehicle has an extremely high crop-carrying capacity. In this respect a roof is provided which can carry both empty cartons and containers full of crops, this roof extending practically over the entire vehicle to also shade the vehicle operator. In addition, side carriers are provided in one embodiment of the vehicle which are essentially suspended at their front ends from the front end of the vehicle and at their rear ends from the roof of the vehicle and are located abreast of the vehicle operator so that he can deposit harvested crops into containers mounted on the trays. Other crop-carrying arrangements are also provided which are carried by the front end of the vehicle or on the supplemental rigs.

The various aspects of the present invention will be more fully understood when the following portions of the specification are read in conjunction with the accompanying drawings wherein:

FIG. 1 is a side elevational view of the improved farm vehicle of the present invention;

FIG. 2 is an end elevational view taken from the right of FIG. 1;

FIG. 3 is a plan view of the vehicle shown in FIGS. 1 and 2;

FIG. 4 is a fragmentary side elevational view of the drive arrangement taken in the direction of arrows 4-4 of FIG. 3;

FIG. 5 is a fragmentary view of the control lever taken substantially in the direction of arrows 5-5 of FIG. 1;

FIG. 6 is a fragmentary view taken substantially in the direction of arrows 6-6 of FIG. 3 and showing the front of the vehicle in an expanded condition;

FIG. 6A is a fragmentary cross-sectional view taken substantially along line 6A-6A of FIG. 1 and showing details of the steering linkage;

FIG. 7 is an enlarged fragmentary view, with certain parts omitted in the interest of clarity, showing the structure of the wheel support;

FIG. 8 is an enlarged fragmentary view, partially in cross section, taken substantially along line 8-8 of FIG. 3 and showing details of the steering mechanism and related structure;

FIG. 9 is a view taken substantially in the direction of arrows 9-9 of FIG. 8;

FIG. 10 is a fragmentary side elevational view, with parts omitted in the interest of clarity, showing another modification of the present invention;

FIG. 11 is a fragmentary side elevational view showing an alternate structure for supporting the rear end of the carrying trays which can be used in any of the preceding embodiments;

FIG. 12 is a view, partially in cross section, taken substantially along lines 12-12 of FIG. 10 and showing details of the front end of the embodiment of FIG. 10 and also showing the manner in which a carrier can be attached to the front end of this embodiment and also showing the manner in which this embodiment can be converted into a three-seat vehicle with the center rider doing the steering;

FIG. 13 is a view generally similar to FIG. 12 but showing the driver's section moved to the right of the vehicle and also showing rider seats in the center and left-hand positions;

FIG. 14 is a view along line 14–14 of FIG. 12; and

FIG. 15 is a view along line 15–15 of FIG. 12.

The improved vehicle 10 consists essentially of three basic sections, namely, a main central frame section which carries the vehicle operator 11, a front-end steering section 12 connected to the main frame assembly, and a superstructure section 13 connected to both.

Main frame assembly 11 includes a single round tubular member 14 having a horizontal portion 15, a vertical portion 16 and an upper horizontal portion 17. Portion 15 is received in square tubular member 18 and is secured therein by any suitable means such as a pin. Member 18 is secured as by welding to square tubular member 19 which extends rearwardly and is secured as by welding to crossbeam 20. A pair of angles 21 are secured to opposite sides of tube 19 and the upper surfaces of the three (FIG. 2) provide a support for seat 22. Extending upwardly from the center of member 20 is a vertical strut 23 which is welded to horizontal cross brace 24 which extends between and is welded to central portions of vertical rods 25, the lower portions of which are welded to the ends of cross brace 20 at 26 (FIG. 2).

Extending rearwardly of rods 25 is the frame structure for supporting the drive engine and related mechanism of the vehicle. The frame structure includes a pair of spaced upper horizontal members 26 having their front ends secured as by welding to crossmember 24 and their rear ends secured as by welding to central portions of roof-supporting vertical rods 27, the lower portions of which are secured as by welding to the horizontal portions of spaced lower frame members 28, the forward portions of which are secured as by welding to lower frame member 20. A pair of diagonal angle struts 29' extend from crossmember 24 to cross angle 29 which has its opposite ends welded to members 28. A cross angle 30 joins the rear ends of members 28. The foregoing frame arrangement provides a sturdy support for the engine and related drive mechanism.

The drive mechanism includes a throttle handle 31 which is mounted on the top of the yoke 32 which is pivoted at 33 to frame member 19. Yoke 32 has sides 34 which provide a friction fit with tubular member 18 so as to hold the throttle in any desired position in which it has been placed. A link 35 is secured to the throttle handle 31 and is attached to links 36, 37, 38 and 39 (FIG. 4) which is secured to the throttle 40 of internal combustion engine 41 having a base 42 which is secured to horizontal portions of angles 29 and 30. A brake lever (not shown) is also coupled to handle 31 and this brake (not shown) is essentially a plate which presses against rear wheel 67. When handle 31 is moved in a first direction, the brake will disengage and the engine will be caused to speed up; when it is moved in the opposite direction, the brake will be applied and the engine slowed down. Preferably, engine 41 is driven by compressed gas which is contained in a tank 43 which is mounted on shelf 44 which extends between horizontal braces 26. The conduit from tank 43 to engine 41 has been omitted in the interest of clarity. Engine 41 includes an output shaft 46 mounting a pulley 47 and a flywheel 48. A belt 49 encircles pulley 47 and pulley 51 which is keyed to shaft 52 journaled in bearings 53 mounted on horizontal angles 54 having first ends secured as by welding to diagonal strut 29' and the second ends secured to vertical angles 55, lower portions of which are welded to diagonal struts 29'. Also mounted on shaft 52 is a centrifugal clutch 50. Whenever engine 41 is idling, centrifugal clutch 50 will be disengaged so that pulleys 47 and 51 will rotate but shaft 52 will remain stationary. However, when the speed of engine 41 is increased centrifugal clutch 50 will engage to drive shaft 52. An output pulley 57 is secured to shaft 52 and is encircled by belt 58 which also encircles pulley 59. Mounted on shaft 60, which is supported by bearings 61 secured to diagonal struts 29', is sprocket 62 which is encircled by chain 63 which also encircles sprocket 64 keyed to shaft 65 mounted in bearings 66 secured to lower frame members 28. The drive wheel 67 is keyed to shaft 65. A belt-tensioning pulley 58' is mounted on lever 59' pivoted at 60', lever 59' having handle 61' at the end thereof. A latch, not shown, is located on post 25 to hold lever 59' in the position shown in FIG. 4, when the vehicle is in operation. It is only during starting of the engine that pulley 58' is moved upwardly to loosen belt 58. The vehicle is driven by the foregoing mechanism.

The front end of the vehicle is supported on spaced wheels 70 which are steered. At this point it is noted that the upper horizontal portion 17 of tubular member 15 is received in square tubular member 71 with a sliding fit. A pin 72 is driven through these members to secure them in position. Member 71 is secured by welding to the underside of horizontal tube 73 having opposite ends 74. Contained within tubular member 73 are two solid rods 75 which are slidable in member 73. In the position shown in FIG. 3 rods 75 have their ends abutting each other at the center of member 73. Either or both rods 75 can be pulled out laterally from tube 73 to vary the spacing of wheels 70 from each other. To this end it is to be noted that a sleeve 76, which is associated with each wheel assembly, is mounted on the ends of each rod 75. Preferably it is pinned thereto but this need not be the case. The center of each sleeve 76 (FIGS. 3 and 7) is welded to plate 77 having an edge 78 which is welded to vertical sleeve 79 which pivotally receives pin 80 of fork 81 which rotatably supports wheel 70, sleeve 79 resting on plate 82 of the fork. A cap 83 is secured to shaft 80 by pin 84 and cap 83 is welded to steering lever 85. Each lever 85 is connected to a tie rod 86 which includes an outer end portion having an end 88 which is superimposed on the end of lever 85 and is secured thereto by a pin 89. Threaded rod portion 87 is threaded into nut 90 secured to tubular shell 86' and this threaded rod extends for the entire length of each shell 86'. Therefore if it is desired to extend the tie rod 86 when the spacing of the wheels is varied, it is merely necessary to unthread portion 87 until the combined length of portion 87 and portion 86' equals the desired spacing of each wheel from the center of the front of the vehicle. In the foregoing respect, before tie rod 86 can be extended, pin 89 is removed to permit rotation of threaded portion 87. In other words, to vary the wheel position, pin 89 is removed, the wheel and its mounting structure attached to tube 76 is physically pulled to a new position, this being permitted by the telescoping connection between rod 75 and tube 73. Thereafter the tie rod is extended and reconnected to the steering lever.

The adjacent portions of tie rods 86 are secured to the steering mechanism at the central portion of the vehicle. More specifically, a post 91 (FIGS. 3, 8 and 9) has its lower portion rigidly affixed as by welding to plate 92 which is in turn welded to the underside of tube 73. A plate or steering bar 93, having aligned sleeves 94 and 95 welded to the opposite sides thereof, is mounted on spindle 91 and an upper sleever 95' is secured to the top of spindle 91 as with a pin connection to maintain the assembly together. A tongue 96 is rigidly affixed to and extends perpendicularly from the center of bar 93 and includes a plurality of spaced leaves 97, 98 and 99 at its outer end which receive spaced plates 100 and 101 therebetween. A pin 102, which extends through aligned holes in leaves 97, 98 and 99 permits plates 100 and 101 to pivot thereon. The outer ends of plates 101 and 100 are clamped to the ends of rods 86. This is effected because the outer ends of plates 100 and 101 are formed into sleeves which receive shells 86' therein which are retained in position by means of setscrews. It can readily be seen that the pivoting of steering bar 93 will result in effecting longitudinal movement of tie rods 86 in the same direction which in turn will cause wheels 70 to pivot about pins 80 on which they are mounted because of the connection between the tie rods 86 and the steering levers 85.

In order to effect the foregoing pivotal movement of steering bar 93, a foot steering control is provided. A tubular bar 103 is welded to member 73 and extends rearwardly thereof. A sleeve 104 is mounted on member 103 and suitably secured thereto. The central portion of shaft 105 is secured to the underside of member 104 as by welding and spacer sleeves 106 are mounted on opposite sides thereof to space legs 107 from each other, said legs being pivotally mounted on the ends of shaft 105 and secured thereon by pins 108 with a large washer 106' located therebetween. The lower ends of legs 107 have footrests 109' thereon. The upper ends of leg portions or steering levers 107 are pinned to steering links 109 by means of pins 110. The ends of links 109 remote from pins 110 are pivotally secured to pins 111 which extend upwardly from steering plate 93. It can readily be seen therefore that as steering levers 107 are pivoted by means of pressure applied by the feet the steering links 109 will travel in opposite directions and transmit a turning force to steering plate 93 which causes turning of the front wheels of the vehicle. The position of footrests or steering pedals 109' may be adjusted toward and away from the seat 22 by merely removing pins 110 and aligning the upper portions of levers 107 with any of the holes 112 in links 109 as desired to position pedals 109' in the optimum position. If desired, chains may be substituted for rigid links 109 as the steering is effected by a pulling force and not a pushing force on such links.

A bumper mechanism is mounted on the front of the vehicle to protect the tie rods. More specifically, spaced plates 115 have their lower portions welded to tubular member 73 and their upper portions welded to links 116 which carry bumper 117 at their outer ends. In addition, the central portion of bumper 117, which may be an elongated rod, is supported above plate 92 by strut 118.

A stabilizing superstructure frame 13 is provided for securing the steering assembly 12 to the driving assembly 11. Essentially this frame includes two inverted U-shaped members 120 consisting of a rear portion 121 and a front portion 122, both of which are hollow tubular members with the portion 122' of the front portion 122 being received in telescoping relationship in rear portion 121. The vertical portions 120' telescopically receive the upper portions 25' of rods 25. The vertical portions of members 122 receive the upper portions 123' of rods 123 which are secured as by welding to the rear edges of plate 77 (FIG. 7). The telescopic connections at portions 25' and 123' permit relative pivotal movement between these elements and the tubular portions 122 and 120', respectively, mounted thereon, and the telescopic connection of portion 122' with portion 121 permits a relative elongation between these two members.

It can therefore be seen that as the spacing of the wheels is varied to permit the wheels to travel between differently spaced rows of crops, the superstructure 13 will automatically adjust to such spacing without any need on the part of the person making the adjustment to in any way make any adjustment of the superstructure. The only thing that need be done to make an adjustment is to uncouple tie rod end 88 from steering lever 85 by removing pin 89, pulling the wheel outwardly as much as desired so that it assumes an orientation such as shown in FIG. 6, and thereafter elongating the tie rod 86 the desired amount and recoupling the end 88 with steering lever 85. Nothing else need be done. The remaining linkage will adjust by itself. The length of the tie rods will control the positions of the wheels after adjustment and the sleeves 76 need not be pinned to rods 75 if this is not desired, although it is preferable that there be a setscrew or pinned connection between rod 75 and sleeves 73 and 76.

A roof structure is provided for the vehicle and includes a roof 125 which is essentially an elongated planar member such as a sheet of plywood. Spaced rods 27 which extend upwardly from the rear of the vehicle are received in sleevelike cups 126 secured to the underside of roof 125. The other end of roof 125 is supported by strut 127 which extends upwardly from strut 118 and is welded thereto. The upper end of strut 127 includes a square sleeve 128 which receives square tube 129 in telescoping relationship, the latter extending centrally underneath roof 125 to point 130. The portion near the front edge is secured to the underside of roof 125 by a setscrew on U-shaped bracket 131. A plurality of additional U-shaped brackets (not shown) are also provided to complete the attachment. Member 129 is essentially the thickness of tube 121 which forms the superstructure. A crossbar 132 (FIG. 3) extends transversely across roof 125 and is spaced therefrom by the thickness of member 121 and is secured to the roof by a plurality of spaced U-shaped brackets 133. As can be seen from FIG. 2, tubular superstructure portions 121 lay up against the underside of the roof and are bracketed between said underside and the top of crossbar 132. However, they are not attached to either member but experience a sliding fit therewith. Therefore, whenever the spacing between the front wheels is adjusted, the superstructure frame can slide relative to the roof and no specific care need be taken during such adjustment. The roof is anchored to the rear portions of the frame at two points by rod 27 and at the front at one point by rod 127. This will maintain the roof in its proper relationship to the remainder of the frame. The roof can be used for carrying empty baskets or baskets full of crops which have been picked, as well as providing shade for the vehicle operator.

During harvesting, the containers for the crops are carried in special crop carriers 135. Each crop carrier 135 includes a frame fabricated of side angles 136, rear angle 137 and front angles 138. The horizontal portions of these angles provide a rest for carrier shelf 139. A rod 140 includes a vertical portion which is received in sleeve 141' located at the juncture of frame portions 138, and is retained therein by a setscrew. The upper horizontal portion 142 of member 140 is received in sleeve 141 which is secured as by welding to the lower horizontal edge of plate 77 (FIG. 7). A bail 143 has the lower portions of its opposite legs 144 secured by pins to the vertical legs of angles 136. The central portion 145 of each bail comprises an eye which is fixed to horizontal portion 146 and this eye receives the lower end of chain 147 which has its upper end mounted on hook 148 which in turn is secured to a rod 149 which is telescopically received within tubular member 132 and can be extended therefrom as required. There are actually two rods 149 which slip into the opposite ends of tubular member 132. It will readily be appreciated that as the spacing of the wheels are varied during the adjustment of the front end, the fronts of the carriers will move out a corresponding amount since they are attached to the wheels and therefore by extending rods 149 from member 132 a corresponding adjustment can be made at the rear end of carriers 135.

In FIGS. 10—15 an alternate embodiment of the present invention is disclosed which can be used for carrying additional riders and which can be converted, if desired, to an arrangement wherein the driver is located at the side of the vehicle rather than at the center, as in the preceding embodiment. More specifically, this vehicle includes a front-end wheel assembly 150 comprising a pair of square tubes 151 and 152 which are spaced by and welded to square vertical tubular members 153. Also, a central square tubular member 154 has its top surface welded to the undersides of spaced tubes 151 and 152 to rigidize the assembly. A first square hollow tubular member 155 is telescopically received within member 151 and a square hollow tubular member 156 is telescopically received within tubular member 152. Members 155 and 156 can be physically pulled outwardly from members 151 and 152, respectively, to extend the wheels 157 to any desired spacing and these members are locked in adjusted position by setscrews 158 and 159, respectively. The outer end of square tubular member 155 is received in hollow square tubular member 160 and the outer end of member 156 is received in hollow square tubular member 161 and secured thereto by pin 162. Pin 163 secures member 155 to member 160. When the front end of the vehicle has wheels 157 spaced a minimum distance apart, the end 164 of member 155 is received in hollow square tubular member 165 and the end 166 of member 156 is received in hollow square tubular member 167, and tubes 161 and 167 abut the opposite ends of tube 152, and tubes 165 and 160 abut the opposite ends of tube 151.

At this point it is to be noted that each of the wheel assemblies is identical to the other and therefore only the right-hand one of FIG. 12 will be described. Tubes 160 and 167 have their undersides welded to square tubular member 168 which has its front end welded to sleeve 169, said sleeve also being welded to the front edge of member 160. A steering pin 170 is pivotally received in sleeve 169 and the lower end of sleeve 169 abuts plate 171 secured to pin 170. Spaced forks 172 depend from plate 171. Wheel 157 is held on axle 173 between forks 172. A cap 174 is affixed to the upper end of spindle or post 170 by a setscrew and rigidly affixed to cap 174 is a steering lever 175.

A pair of tie rods 176 are provided and each tie rod has its end secured to lever 175 as by pin 177 and each rod 176 is received in a sleeve 178. At this point it is to be noted that there are two sleeves 178 and each sleeve is analogous to sleeve 86' of FIGS. 1—9. Furthermore, each rod 176 is secured to its respective sleeve by a setscrew 179, rather than by a threaded connection as in FIGS. 1—9, to facilitate the changing of tie rod length. At this point it is to be noted that a pair of sleeves 180 are provided into which sleeves 178 are received and secured thereto by setscrew 181. Sleeves 180 include tongues 182 rigidly affixed thereto which are pivotally mounted on pin 183 with extends between plates 184 and 185 formed at the end of portion 186 of steering bar 187 having a T-head 188. T-head 188 has its central portion pivoted on post 189 which extends perpendicularly upwardly from tubular member 151. Chains 190 are suitably attached to pins 191 at the ends of T-head 188, and the rear portions of chains 190 are secured to a foot steering mechanism such as described in detail above relative to FIGS. 1 to 9 but the details of which are omitted from FIGS. 10—12 in the interest of clarity and brevity. At this point it is to be noted that the central engine and operator carrying section of the vehicle shown in FIGS. 10—14 may be identical in all respects to section 11 shown in the embodiment of FIGS. 1 to 9 and therefore in the interest of brevity the motor assembly, seat and related framework will not be described again.

It is also to be noted that the superstructure 121-122 is also identical to that described above relative to FIGS. 1—9 and therefore the repetition of a description of this structure will be omitted in the interest of brevity. The only difference between the superstructure of these Figures as compared to FIGS. 1—9 is that setscrews 191 are provided to lock members 121 and 122 to each other in adjusted position, and these setscrews may also be incorporated into the embodiment of FIGS. 1—9 if desired. The lower portion of each tube 122 fits telescopically onto rod 168' which has its lower portion welded to the top of member 168, and the portion adjacent to said lower portion welded to tube 167.

In the embodiment of FIGS. 10—15 the vehicle can be converted from one in which the driver is at the center of the vehicle to one in which the driver is located at either side of the vehicle. To this end a square tubular member 192 is telescopically received in square tubular member 154 and the two are secured to each other by means of pins 193. The square tube 104 (FIG. 5) which mounts the steering links 107 may be telescopically mounted on square tube 192. Depending downwardly from square tube 192 is a round sleeve 194 into which round tube 195 is telescopically received and secured thereto by means of pin 196. In order to shift the center drive frame which mounts the motor and seat to either the left-hand side or the right-hand side of the front frame, it is merely necessary to separate tube 192 from tube 154 after pin 193 has been removed and thereafter telescopically slide square tube 192 into square tube 168 (FIG. 10) or into square tube 168' (FIG. 13). The configuration which the vehicle assumes after the foregoing shifting has taken place is shown in FIG. 13 where the driver section has been attached to square tube 168. The same shifting can be effected by inserting square tube 192 (FIG. 14) into tube 168'. At this point it is to be noted that tubes 154, 168 and 168' are all at the same elevation to permit the foregoing to be effected.

It is also to be noted that the foregoing transformation can be effected extremely simply because a steering bar 197 is rigidly secured to cap 174. Therefore, after the main section has been inserted into tube 168 as described above, all that need be done is attach the front ends of chains 190 to pins which extend upwardly 198 from member 197. It is to be noted that an identical structure 197'-198' is mounted on the left wheel (FIG. 12). Therefore the center driver section can be coupled quickly to either end of the front of the vehicle. There need be no adjustment or change whatsoever of the steering linkage at the center of the frame because any motion transmitted to steering lever 197 or 197' will automatically be transmitted to the other wheel through the center linkage 188. The above-described shifting of the section containing the engine either to the right or the left of the vehicle from the center is provided for the convenience of the vehicle operator who may have a preference as to where he desires to sit, as there are certain positions which are advantageous over others for different crops and under different circumstances.

As noted above relative to the embodiment of FIGS. 1 to 9, the rear ends 120' of members 121 are pivotally mounted on posts 25 and the front ends of members 122 are pivotally mounted on posts 168''. Therefore, the inverted U superstructure 121-122 must shift from the position shown in FIG. 12 to the position shown in FIG. 13 when there is a change from a center drive to a right-hand drive. This can be done because of the telescopic fit between the horizontal upper portions of the superstructure as described in detail above relative to FIGS. 1—9. Setscrews 191 are loosened before and are tightened after the transformation has been completed.

As can be seen from a comparison of FIGS. 12 and 13 the roof 199 moves with the central portion 11 from a central position (FIG. 12) to a side position (FIG. 13) when the foregoing shifting of the central engine-carrying section 11 is effected. This of necessity must be the case because the rear end of the central engine section includes posts 27 which support the roof because of their connection with cups 126, as described above relative to FIGS. 1—9. This structure has been omitted from FIGS. 10—15 in the interest of brevity. At this point it is to be noted that the central engine-carrying section 11 of FIGS. 1—9 is utilized in identical form in the embodiment of FIGS. 10—15 and it is for this reason that specific details thereof have been omitted from the latter figures in order to avoid unnecessary repetition, but it will be understood that it forms a part of this embodiment.

The front end of roof 199 is essentially supported by two spaced posts 200 each of which is received in square tubular spacer members 153 (FIG. 12) and which may be welded thereto or otherwise attached either permanently or temporarily. An angle 201 (FIG. 10) extends between and is rigidly secured to the upper ends of posts 200 as by welding. A second angle 202 has its horizontal leg permanently affixed to the underside of roof 199 and its vertical leg 203 in abutting relationship with the vertical leg 204 of angle 201. Furthermore, an arm 205 has its lower portion rigidly secured as by welding to each post 200 and includes a setscrew 206 at its upper portion to clamp the vertical legs 203 and 204 together. More specifically, vertical leg 204 and arm 205 are fixed relative to each other but vertical leg 203 can slide relative to both of them after setscrews 206 have been loosened. Therefore, as noted above, the roof 199 will shift to the right with the center section 11 of the vehicle when it is moved from the position shown in FIG. 12 to the position shown in FIG. 13 because of the permanent connection at the rear end of the vehicle. However, before such shifting is effected, setscrews 206 are loosened to permit longitudinal sliding movement between angles 201 and 202. After the desired position of roof 199 has been obtained in shifting with the central portion 11 of the vehicle, the right-handed setscrew 206 will be tightened in FIG. 13 to secure the roof to angle 201 carried by the upright posts, but the left-handed setscrew 206 will no longer be in engagement with angle 202. Therefore, in either the right-hand or the left-hand position of the roof only one setscrew 206 will hold it in position. However, it will be noted that there will be an overlap between portions of angles 201 and 202 to rigidize the assembly.

All of the embodiments of the invention can carry additional riders, and rigs 207 for supporting such riders are shown in FIGS. 10—12. These rigs can be installed with a minimum of time and effort to convert the vehicle from a single-seater driven by the operator to a double or triple seater More specifically, rig 207 includes a bent conduit 208 having a vertical portion 209 and a horizontal portion 210 which is received in any one of square tubular members 168, 168', or 154, as desired, and is retained therein by pin 211 or pin 193, FIG. 15. The foregoing can be effected because, as noted above, each of tubes 168, 168' and 154 are at the same elevation. Telescopically received on vertical leg 209 is a tube 212 which is welded to upright 213 which in turn has its lower end welded to spaced angles 214 which comprise the longitudinal frame of the rig 207. Pin 213' is placed underneath sleeve 212 to hold the assembly together. A seat 215 is mounted as shown on each rig 207. A rear wheel 216 has its axle supported in spaced bearings 217 on members 214. There is no connection between the rear ends of rig 207 and the remainder of the vehicle. This can best be seen from FIGS. 12 and 13. In other words, the rear end is free floating. However, to stabilize the assembly a square tubular member 218 is provided which is pivoted by pin 219 between spaced members 214. A tubular member 220 has its lower portion telescopically and slidingly received in member 218 and a bracket 221 is provided at the top of member 220. Bracket 221 consists of spaced plates 222 which are welded to opposite sides of tube 220. A tube 223 is pivotally mounted between spaced plates 222 by pin 224 and tube 223 is telescopically received in sleeve 225 which is held in a vertical upright position by being secured, as by welding, between upper and lower spaced paris of links 226 and 227, respectively, which have their forward ends secured, as by welding, to member 122. Footrests 236 are secured to angles 214.

It is to be noted that tube 223 and portion 209 of member 208 are coaxial so that the seat 215 may pivot about this axis while the vehicle is being driven and this seat is thus self-aligning. In order to remove the rig 207 from the remainder of the vehicle all that need be done is to remove pin 211, pull member 208 from member 168 and slide member 223 upwardly out of tube or sleeve 225. The rig is then separated. To install the rig, the reverse is effected.

A shelf 228 is selectively mountable on member 218 for holding produce containers. This shelf includes a tubular member 229 which slides onto tubular member 218 and is secured thereto by setscrew 230. A pair of arms 231 include sleeves 232 at their ends which are pivotally mounted on pin 233 which is secured as by welding at its central portion to sleeve 229. Therefore, shelf 228 may be pivoted in the direction of arrow 234 so as to permit the rider to seat himself comfortably, and after he is so seated it is pivoted in the reverse direction. A bar 235 is welded across tube 229 and arms 231 rest on this when shelf 228 is in the horizontal position shown in FIG. 10.

If two rigs 207 are used as shown in FIGS. 12 and 13, a modified form of produce carrier 237 may be utilized in addition to shelf 228. This carrier includes a square tubular member 238 which is secured to the underside of square spacer member 239 slidably located between members 151 and 152 and clamped in position by plate 240 secured to member 238 by screw 241. A stem 242, which mount posts 243 at its outer end, is telescopically received in member 238. Post 243 is telescopically received in sleeve 244 which is secured thereto by setscrew 245. The frame of the produce carrier 237 is affixed to sleeve 234 and can be mounted and demounted from post 243, as required. Furthermore, produce carrier 237 can be slid to any desired position between members 151 and 152. In addition, the supporting structure for carrier 237 may be turned upside down so as to place carrier 237 at any desired elevation.

In the event that two rigs 207 are not being used, a modified form of the article carrier 135 of FIGS. 1—9 may be used. This modified form includes a tube 246 which is secured as by welding to the center of the rear angle 137 (FIG. 3) of the carrier 135. A tube 247 is received therein with a telescopic fit and secured thereto by pin 248. The upper end of pin 247 is received in sleeve 249 and held therein by pin 250. A sleeve 251 is rigidly affixed to sleeve 249 and extends perpendicularly thereto. Sleeve 251 is mounted on rod 149' which corresponds to rod 149 of the embodiment of FIGS. 1—9. A pair of spaced cotter pins 252 are located on opposite sides of sleeve 251 to retain it in position. This construction is preferred to the chain 147 of FIGS. 1—9 because it holds the rear end of the carrier rigid rather than permitting it to swing as in the embodiment of FIGS. 1—9. It will be appreciated that rod 149' is mounted in the same manner as rod 149 to move laterally to align the carriers, as desired.

A bumper 252 is secured to the ends of members 253 which are in turn welded to posts 200 at the tops of sleeves 153. This bumper is analogous to bumper 117. Furthermore, for extra produce-carrying capacity, a shelf, not shown, can be laid horizontally across bumper 252 and members 253 and suitably secured relative thereto, as by notches in the ends of the shelf which receive posts 200.

In FIG. 13 the rider rigs 207 have been shown in the central and left-hand position merely for purposes of illustration to show that these sections are interchangeable with the driver section 11. However, it must be stressed that whenever the rider rigs 207 are used, the driver section 11 should be located in the central position as shown in FIG. 12 to provide balance to the vehicle. In other words, it is intended that the driver section 11 be shifted only to the left-hand or right-handed side of the vehicle when it is being used by itself and such shifting is desired by the vehicle operator. However, the arrangement such as shown in FIG. 13 can be used if desired, but as noted above the vehicle will not be as balanced as it would be in FIG. 12 where the driver section 11 is in the center.

As noted above, the superstructure 13 consisting of inverted U-shaped members 120 stabilizes the vehicle in all positions thereof. In this respect it provides stabilization whether the driver section 11 is located centrally or at the sides of the front section 12 because it is capable of shifting from the position shown in FIG. 12 to the position shown in FIG. 13. Furthermore, even when either front wheel of all the previous embodiments is shifted outwardly, the stabilizing superstructure moves with the wheel to provide rigidity because the connection between the wheel assembly and the central section is maintained. Not only does the superstructure provide the foregoing stabilization but it is to be especially noted that it is always out of the way. It leaves the central section 11 unobstructed so that the vehicle operator does not have to climb over any framework to mount and dismount from the vehicle.

While not shown in FIGS. 10—15, a pair of stabilizing tubes can be used to further stabilize the front end of the vehicle. Each tube is square and each tube fits telescopically into hollow square tubes 156 and 155. The outer end of each of these stabilizing tubes is enlarged and fits into tubular members 167 and 165 and is pinned to these members. The outer enlarged ends are approximately one-fourth the length of tubes 167 and 165 and are pinned to their outer ends. Therefore, each end maintains a connection at two points to each wheel. More specifically, for example, a square stabilizing tube fits into end 166 of tube 156 and extends most of the length thereof. The end of this stabilizing tube (not shown) is enlarged and fits into square tube 167 and is pinned thereto so that as the right wheel is pulled out the sliding connection between this additional tube and tube 166 will maintain a stabilizing sliding fit between tubes 156 and 167. A similar arrangement is provided between tubes 155 and 165. When the front end of the vehicle is pulled together to its smallest dimension, the left end of tube 167 will abut the right end of tube 152, end 166 of tube 156 will be received in tube 167, and the stabilizing tube will have a portion received in tube 156 and the remainder in tube 167. An analogous relationship exists at the other edn of the front section. At this point it is to be noted that the length of tubes 155 and 156 have been exaggerated in FIGS. 12 and 13 for the purposes of illustration. Actually tubes 155 and 156 are each slightly shorter than the combined length of tubes 152, 167 and 161 when the stabilizing tube is not used. When the stabilizing tube is used, the length of tube 156 plus the length of the enlarged end of the stabilizing tube is approximately equal to the combined length of tubes 161, 152 and 167. The same is true of the tubes associated with tubes 151, 165 and 160.

Also, while not shown in the drawings, an angle member can have its horizontal leg attached to the top of the outer edges of the roof to stabilize the roof and the vertical legs of such angles can provide a rim to prevent crop containers from sliding off the roof.

In the above description it was indicated relative to FIG. 14 that pin 193 is pulled to disconnect the central portion 11 from the front portion of the vehicle. However, if desired pin 196 can also be pulled to drop tube 195 before tube 192 is pulled from tube 164. This simplifies the disassembly because in this manner the central section 11 need not be pulled rearwardly to disengage tube 192 from tube 154.

I claim:

1. A farm vehicle comprising a first section extending transversely to the direction of movement of said vehicle, first and second spaced wheels mounted on said first section, adjustment means for varying the spacing between said first and second wheels, a second section extending transversely to said first section in the direction of movement of said vehicle, means connecting said second section to said first section, a seat on said second section for carrying an operator, said seat being located sufficiently close to the ground to permit a vehicle operator to harvest low-growing crops while sitting on said seat and operating said vehicle, a third wheel on said second section, stabilizing means pivotally connected to said first and second sections for stabilizing said first and second sections relative to each other in all adjusted positions of said first and second wheels, said stabilizing means comprising a member having a connecting portion and first and second spaced attachment portions extending from said connecting portion, first means connecting said first attachment portion to said first section and second means connecting said second attachment portion to said second section, said first wheel being mounted on a first wheel assembly and said first means being located between said first wheel assembly and said first attachment portion, said adjustment means permitting the movement of said first wheel assembly laterally with respect to said second wheel, said member comprising a generally inverted U-shaped member having an upper portion, said spaced attachment portions comprising first and second legs depending downwardly from said upper portion, and said first means comprising a post extending upwardly from said first wheel assembly and having a pivotal connection with said first leg.

2. A farm vehicle as set forth in claim 1 including a plurality of supplemental rider rigs, and means on said front section for detachable attaching said supplemental rigs thereto for carrying riders in substantially parallel relationship to said second section.

3. A farm vehicle as set forth in claim 1 including a supplemental rider rig, and means on said front section for detachably attaching said supplemental rig thereto for carrying an additional rider in substantially parallel relationship to said second section.

4. A farm vehicle as set forth in claim 3 wherein said supplemental rig includes a longitudinal section having a front end and a rear end, a fourth wheel supporting said rear end, and wherein said means for detachably attaching said supplemental rig comprises a first connection between said front section and said front of said rig, and wherein said stabilizing means includes an elevated portion extending above said first section, an elongated link, a second connection between said elevated portion and one end of said elongated link, and a third connection between said longitudinal section and said elongated link.

5. A farm vehicle as set forth in claim 1 wherein said upper portion of said member includes a telescopic connection.

6. A farm vehicle comprising a first section extending transversely to the direction of movement of said vehicle, first and second spaced wheels mounted on said first section, adjustment means for varying the spacing between said first and second wheels, a second section extending transversely to said first section in the direction of movement of said vehicle, means connecting said second section to said first section, a seat on said second section for carrying an operator, said seat being located sufficiently close to the ground to permit a vehicle operator to harvest low-growing crops while sitting on said seat and operating said vehicle, a third wheel on said second section, stabilizing means pivotally connected to said first and second sections for stabilizing said first and second sections relative to each other in all adjusted positions of said first and second wheels, said stabilizing means comprising first and second members each having a connecting portion and first and second spaced attachment portions extending from said connecting portion, first means connecting each of said first attachment portions to said first section and second mans connecting each of said second attachment portions to said second section, said first wheel being mounted on a first wheel assembly and said second wheel being mounted on a second wheel assembly, one of said first attachment portions being connected to said first wheel assembly and the other of said attachment portions being connected to said second wheel assembly, said adjustment means permitting the movement of said first and second wheel assemblies laterally on said first section to adjust the spacing therebetween, said first and second members each being of generally inverted U-shaped configuration having an upper portion and said first and second attachment portions comprising first and second legs depending downwardly from each of said upper portions, and said first means comprising a first post extending upwardly from said first wheel assembly and having a pivotal connection with one of said first legs, and a second post extending upwardly from said second wheel assembly and having a pivotal connection with the other of said first legs.

7. A farm vehicle as set forth in claim 6 including third and fourth post means extending upwardly from said second section, and wherein one of said second legs provide a pivotal connection with said third post means and said fourth post means provides a pivotal connection with said fourth post means.

8. A farm vehicle as set forth in claim 6 including carrier means for mounting containers, first carrier attachment means on said carrier means for attachment to said first section, and second carrier attachment means for effective attachment to at least one of said upper portions of said inverted U-shaped member.

9. A farm vehicle as set forth in claim 6 wherein said first and said second wheel assemblies are identical each of said wheel assemblies comprising axle means for supporting a respective wheel for rotation, a pin for supporting each of said respective wheels for turning movement, a sleeve housing said pin, a steering lever coupled to said pin, and means for attaching said wheel assembly to the remainder of said front section.

10. A farm vehicle as set forth in claim 9 wherein said front section comprises a pair of spaced first and second substantially parallel tubes, first and second elongated rods means telescopically received in said first and second elongated tubes, respectively, for mounting said means for attaching each wheel assembly to the remainder of said front section.

11. A farm vehicle comprising a first section extending transversely to the direction of movement of said vehicle, first and second spaced wheels mounted on said first section, a second section extending transversely to said first section in the direction of movement of said vehicle, a seat on said second section for carrying an operator, a third wheel on said second section, means including a first element for detachably connecting said second section to said first section in a first position and a second element laterally spaced from said first element for selectively connecting said second section to said first section in a second position which is laterally displaced from said first position.

12. A farm vehicle as set forth in claim 4 including means for varying the spacing between said first and second wheels.

13. A farm vehicle as set forth in claim 12 wherein said first element is located on said first section between said first and second wheels, and wherein said second element causes said second section to always be in substantial alignment with said first wheel.

14. A farm vehicle as set forth in claim 12 including a third element on said first section for detachably connecting said second section to said first section, said third element causing said second section to be in substantial alignment with said second wheel in all positions of said second wheel.

15. A farm vehicle as set forth in claim 13 wherein said first section is located at the front of the vehicle, first steering linkage means on said first section coupling said first and second wheels, and second steering linkage means on said second section for detachable attachment to said first steering linkage means when said second section is connected to said first section both by said first element and said second element.

16. A farm vehicle as set forth in claim 13 including a supplemental rider rig including an elongated frame with first and second ends, means on said first end for attachment to said second element, and a fourth wheel proximate said second end for supporting said second end.